F. X. SCULLY.
MACHINE FOR CUTTING SHEER FABRICS INTO STRIPS.
APPLICATION FILED FEB. 20, 1919.

1,315,340.

Patented Sept. 9, 1919.
2 SHEETS—SHEET 1.

INVENTOR
BY
ATTORNEY

F. X. SCULLY.
MACHINE FOR CUTTING SHEER FABRICS INTO STRIPS.
APPLICATION FILED FEB. 20, 1919.

1,315,340.

Patented Sept. 9, 1919.
2 SHEETS—SHEET 2.

INVENTOR
BY
ATTORNEY

UNITED STATES PATENT OFFICE.

FRANCIS X. SCULLY, OF BROOKLYN, NEW YORK, ASSIGNOR TO THE WOLF COMPANY, A CORPORATION OF NEW YORK.

MACHINE FOR CUTTING SHEER FABRICS INTO STRIPS.

1,315,340.        Specification of Letters Patent.        Patented Sept. 9, 1919.

Application filed February 20, 1919. Serial No. 278,195.

*To all whom it may concern:*

Be it known that I, FRANCIS X. SCULLY, a citizen of the United States, residing at 454 Lexington avenue, borough of Brooklyn, county of Kings, city and State of New York, have invented an Improvement in Machines for Cutting Sheer Fabrics into Strips, of which the following is a specification.

The invention is an improvement in machines for cutting sheer fabrics into strips. One of the objects is to provide a machine which will operate efficiently to cut a plurality of strips at a time. Another object is to provide the same with improved yielding feed means.

In the accompanying drawings, forming a part hereof:

Figure 1:
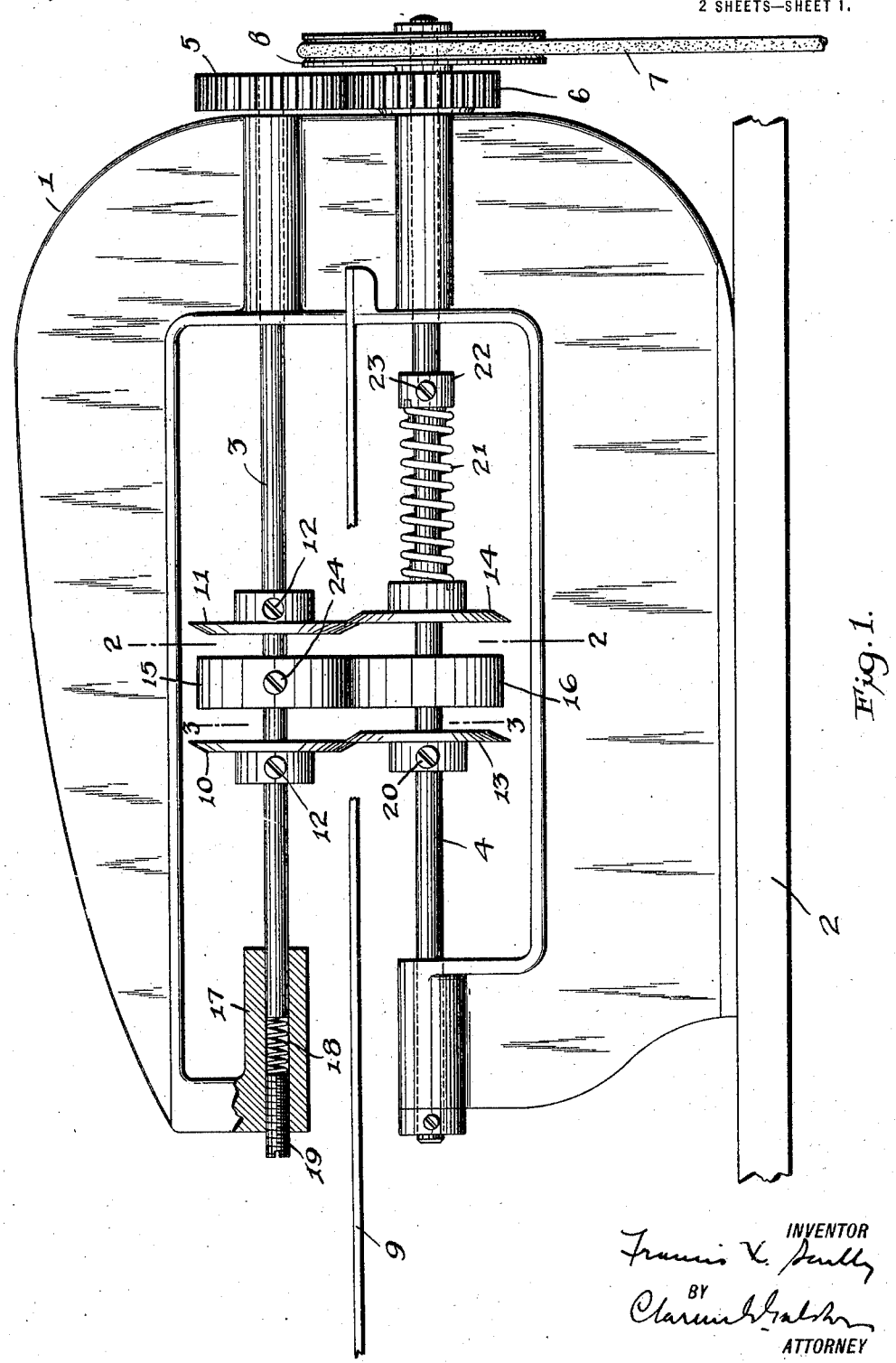
Figure 1 is a front elevation of the machine with parts broken away and in section.
Figures 2, 3:
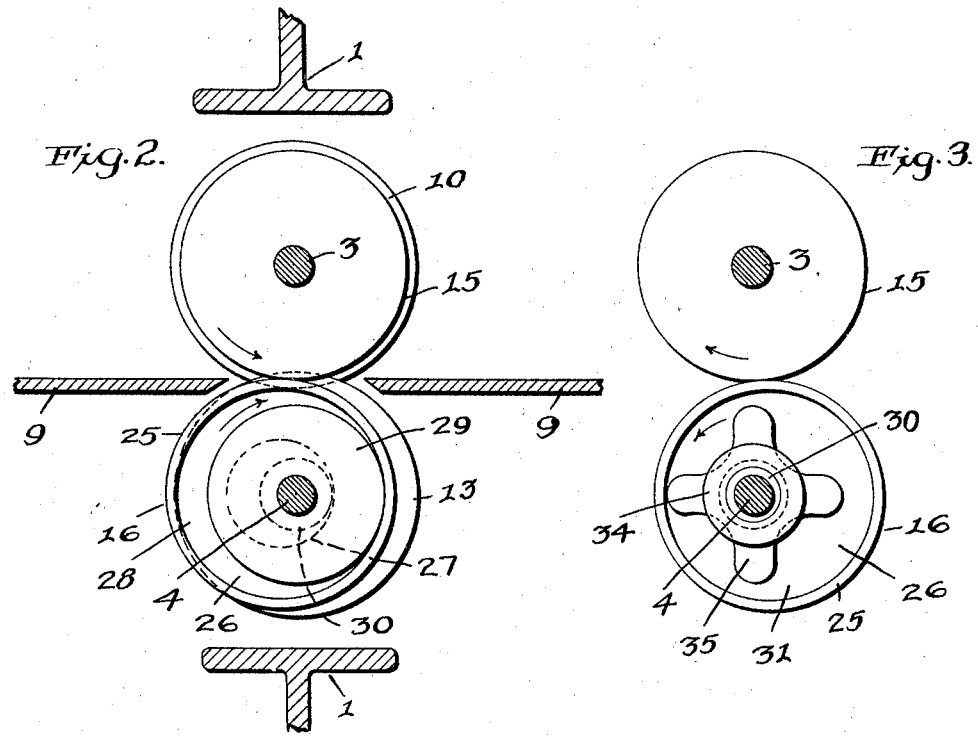
Fig. 2 is an enlarged vertical section on the line 2—2 of Fig. 1.
Fig. 3 is a vertical section on the line 3—3 of Fig. 1.
Figure 4:
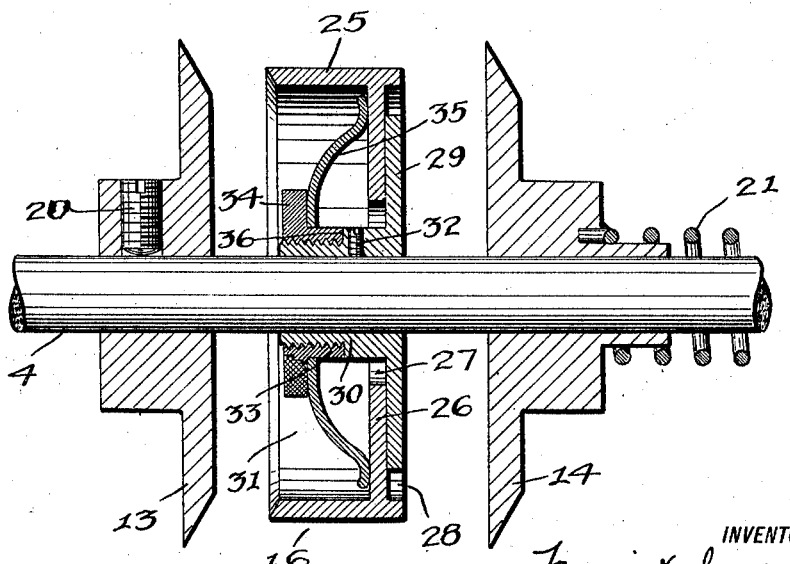
Fig. 4 is a section in the plane of the axis of the lower shaft, taken on a still larger scale.

The machine has a horizontal U frame 1 mounted on a table 2. Horizontal shafts 3 and 4 are journaled in the upper and lower parts of the frame. The shaft 3 can move endwise in its bearings, while the shaft 4 is held against longitudinal movement. Meshing gears 5, 6 on the rear ends of the shafts, outside the frame, compel them to turn in opposite directions, when driven through a belt 7 and a pulley 8 on one of the shafts. The shearing disks on each shaft face in the same direction.

A suitable feed surface 9, the intermediate and outer portions of which are shown broken away for convenience of illustration, is supported between and in front of the shafts.

On the upper shaft 3 two beveled cutter disks 10, 11 are adjustably fixed by set-screws 12. Similar disks 13, 14 are mounted on the lower shaft 4, the disks 10 and 13 coacting as a shearing couple, and the disks 11 and 14 forming another couple. Between the two pairs of cutters is a pair of feed rollers 15, 16. The cutter disks 10 and 13 project beyond the meeting plane of the feed rollers from opposite sides, above and below.

The endwise movable shaft 3, having the cutters 10 and 11 fast thereon, is pressed inside its bearing 17 by a tension spring 18, backed by an adjustable abutment screw 19. On the other shaft the disk 13 is adjustably fixed by a set-screw 20, while the cutter 14 is movable lengthwise and is pressed against its mate 11 by an individual tension spring 21. The said spring is held under compression between the disk 14 and a collar 22 on the shaft, to which its ends are anchored, so that the spring serves also as a driving connection. The position of the collar 22 lengthwise on the shaft can be varied by virtue of a set-screw 23.

From the foregoing it will be perceived that the members of both pairs of cutters are urged resiliently against each other, that the tension of both pairs can be regulated by a single adjustment, and that the spacing of the cutters relatively to the feed rollers and therefore the width of the cut strips, can be readily varied.

The feed roller 15 heretofore referred to is secured to its shaft 3 by a set-screw 24. The roller 16, however, is of special construction. It comprises a hollow rim 25 with an internal web 26 toward one side, the diameter of the central opening 27 of the web being such as to permit the part to shift transversely in all directions relatively to the shaft 4. A shallow chamber 28 at one side of the web accommodates a frictional side-bearing disk 29, which is integral with a hub 30 extending freely through the web into a large chamber 31 of the roller at the opposite side. The said hub is adjustably held to the shaft by a set-screw 32.

An abutment collar 33 is screwed onto the hub 30 within the chamber 31, and is provided at its outer end with a flange 34. Between said flange and the inner face of the web 26, and housed within the roller, is a cruciform or mutiple-arm bowed spring 35, the central opening of the spring surrounding the collar 33, and the ends of its arms bearing frictionally against the web. This spring constitutes a tensioned, slip driving connection, permitting the roller 16 to maintain a constantly changing eccentric relation to its shaft, so as to yield to any inequalities in the material while always preserving uniform driving pressure thereon. The tension of the spring can be regulated by screwing the collar slighty in or out on the hub, a stop shoulder 36 limiting the degree of compression. The construction of the roller is very compact, enabling the disks 13 and 14 to be set in close if desired.

What is claimed as new is:

In a strip-cutting machine and in combination with a pair of shafts and coacting cutter disks thereon, feed rollers on the shafts, one of said rollers being shiftable in all directions transversely on its shaft and having a web and a chamber at one side of the web, a side-bearing disk at the opposite side of the web having a hub passing through the web into said chamber and secured to the shaft, an abutment screwed on said hub within the chamber and a multiple-arm bowed spring interposed as a frictional slip driver between the hub and web.

FRANCIS X. SCULLY.